United States Patent [19]

Tarrant et al.

[11] Patent Number: 5,352,709

[45] Date of Patent: Oct. 4, 1994

[54] ALGAL PLASTICS

[75] Inventors: Laurence B. Tarrant, Harvard, Mass.; Toshimasa Tokuno, Tokyo, Japan; Satya Shivkumar, Worcester, Mass.

[73] Assignee: International Technology Management Associates, Ltd., Harvard, Mass.

[21] Appl. No.: 11,408

[22] Filed: Jan. 29, 1993

[51] Int. Cl.$^5$ ............... C08J 9/06; C08J 9/12; C08L 1/08; C08L 3/04
[52] U.S. Cl. ...................... 521/84.1; 536/3; 524/9; 521/109.1
[58] Field of Search .............. 524/9, 17; 536/3; 521/84.1, 109.1

[56] References Cited

U.S. PATENT DOCUMENTS

| | | | |
|---|---|---|---|
| 3,725,291 | 4/1973 | Serbus et al. | 524/9 |
| 4,320,208 | 3/1982 | Reischl et al. | 521/102 |
| 4,454,259 | 6/1984 | Reischl jet al. | 523/129 |
| 4,605,444 | 8/1986 | Wiedmann et al. | 106/138 |
| 4,673,438 | 6/1987 | Wittwer et al. | 106/126 |
| 4,732,775 | 3/1988 | Millauer | 426/635 |
| 4,879,232 | 11/1989 | MacDonald | 435/179 |
| 4,889,902 | 12/1989 | Meister | 527/400 |
| 4,940,764 | 7/1990 | Meister | 527/400 |
| 4,990,348 | 2/1991 | Spratt et al. | 426/242 |
| 5,095,054 | 3/1992 | Lay et al. | 524/47 |

FOREIGN PATENT DOCUMENTS

| | | |
|---|---|---|
| 0404727 | 12/1990 | European Pat. Off. . |
| WO86/03505 | 6/1986 | PCT Int'l Appl. . |
| WO92/04408 | 3/1992 | PCT Int'l Appl. . |

OTHER PUBLICATIONS

Rowell et al. "Emerging Technologies for Materials and Chemicals from Biomass" American Chemical Society Symposium Series, vol. 476, Chapters 3, 12, 13 and 18, Aug. 1990.

*Primary Examiner*—John Kight, III
*Assistant Examiner*—Jeffrey Culpeper Mullis
*Attorney, Agent, or Firm*—Lahive & Cockfield

[57] ABSTRACT

This invention pertains to foamed algal plastics and products made therefrom, and methods for making algal plastics. The invention also pertains to algal plastic resin precursors for generating the foamed algal plastics and algal plastic products. The foamed algal plastics comprise a foamed and stabilized algal fiber matrix having substantial dimensional stability. The foamed algal plastics can be used, for instance, to generate packing materials, such as molded packings or foamed particles packings (e.g. packing peanuts).

52 Claims, 9 Drawing Sheets

ALGAL PLASTICS

BACKGROUND OF THE INVENTION

Foamed packing materials have become a major component of the packing industry because of their strength, light weight, and shock absorptive and insulating capacities. Until recently nearly all of the foamed packing materials, loose and molded, were made from polystyrene resins. These resins have excellent properties, and form the standard against which other packing materials are measured.

Solid foamed packing materials are used wherever optimum inherent shock absorbance and thermal insulation are required. The former is the most important factor in solid molded packings for shipping protection of electronics and other fragile materials including business machines, electrical components, computers, tools, major appliances, hardware, and toys. The latter is more important in applications such as cups for hot liquids or molded packings for the insulation of warm foods. Cups for hot liquids obviously also depend upon non-dissolution of these materials in water.

The majority of plastics fall into the category of petro-plastics, which are a non-energy product of petroleum chemicals. Petroleum-based plastics are considered to be nonbiodegradable, or at best only slowly biodegradable. This, coupled with the amount of plastics produced and ending up as litter or in landfills, is primarily responsible for the activity towards plastics that are biodegradable. In the U.S. alone, about 58 billion pounds of petroleum-derived plastics were produced in 1989. Municipal solid waste contains 7% by weight and 17–25% by volume of plastics, largely from packing materials. While traditional plastics can be altered to enable facile chemical degradation, the toxicity of the residues have yet to be defined.

Replacement of petrochemically based plastics by biologically derived plastics would reduce petroleum usage. Litter from such plastics would disappear into its surroundings to leave only normal biological residues. Integrated waste management practices that include off-landfill composting of biodegradable wastes, incineration, some reduction of packaging materials, and recycling could help bring waste disposal under control.

For several years there has existed an interest in developing biodegradable loose packings from vegetable materials. These materials are generally made from corn and other starches and can include the addition of other materials which act to enhance polymerization, chemical crosslinking, or flexibility. These loose packings have been formed by a variety of standard foaming and extrusion methods derived from polystyrene foam production, or the extrusion or explosive popping of cereal foods. However, these largely starch-based materials are often not well suited for many applications of solid packing foams because of their relatively rapid breakdown under wet conditions, and their inherently low breaking strengths.

SUMMARY OF THE INVENTION

This invention pertains to foamed algal plastics and products made therefrom, and methods for making algal plastics. The invention also pertains to algal plastic resin precursors for generating the foamed algal plastics and algal plastic products. The foamed algal plastics comprise a foamed and stabilized algal fiber matrix having substantial dimensional stability. The foamed algal plastics can be used, for instance, to generate packing materials, such as molded packings or loose particles packings (e.g. packing "peanuts").

The algal plastics and algal plastic precursors are made from filamentous green algae of the Division Chlorophyta, Class Chlorophycaeae, and Order Cladophorales, and include at least the following genera: Cladophora, Chaetomorpha, Rhizoclonium, Pithophora, Valonia, Valoniopsis, Cladophoropsis, Boergesenia, Anadyomene, Microdictyon, Boodlea, Chamacdoris, and Dictyosphaeria. For example, the species *Cladophora glomerata* Kuetzing can be used to form the algal plastics of the present invention.

The algal plastics can also include application additives, such as antioxidants, antistatic agents, compatibilizers, flame retardants, heat stabilizers, water repellents, impact modifiers, lubricants, ultraviolet stabilizers, biocides, pigments, colorants, fillers, impact modifiers/plasticizers, foam stabilizers, viscosity modifiers, and combinations thereof. The application additives can be mixed into an algal pulp before or concurrently with the generation of the algal fiber matrix, or can be used to coat the already formed algal plastic. For example, the algal plastic can include, an additional polysaccharide component, such as unmodified vegetable starches, modified vegetable starches, alginates, glycose-aminoglycans, hexosamines, pentosans, guar gums, cellulose, methylcellulose, hydroxypropyl cellulose, hydroxyethylcellulose, hydroxypropylmethylcellulose, hydroxypropylbutylmethylcellulose, sodium carboxy methylcellulose, polyvinyl- pyrrolidone bentonite, agar, dextran, chitin, polymaltose, polyfructose, pectin, and combinations thereof. For instance, a high gluten starch, such as starch isolated from sticky rice, can be added to the algal pulp and incorporated into the algal fiber matrix of the plastic.

The foamed algal plastics can be formed by subjecting an algal pulp to foaming process which produce cellular plastic foams, including, for example, isocyanate base techniques, volatization of component(s) of the algal pulp such as blowing agents or water, vacuum expanding gases disolved in the algal pulp, whipping gases into the algal pulp, and dissolving crystals or other small particles into the pulp and subsequently removing them after stabilization of the foam.

The algal plastics and algal plastic products of the present invention provide unique advantages. For instance, in terms of environmental concerns, the use of algae in plastic engineering can lead to a decreased use of synthetic polymers which would otherwise require the use of a greater amount of environmentally hazardous chemicals, such is of concern when petrochemical are used. The algal plastics can be formulated so as to be biodegradable and/or recyclable. Furthermore, the dimensional stability qualities of the algal plastics can be within the range of synthetic plastics used in the same or similar applications.

DETAILED DESCRIPTION OF THE INVENTION

Figure 1:
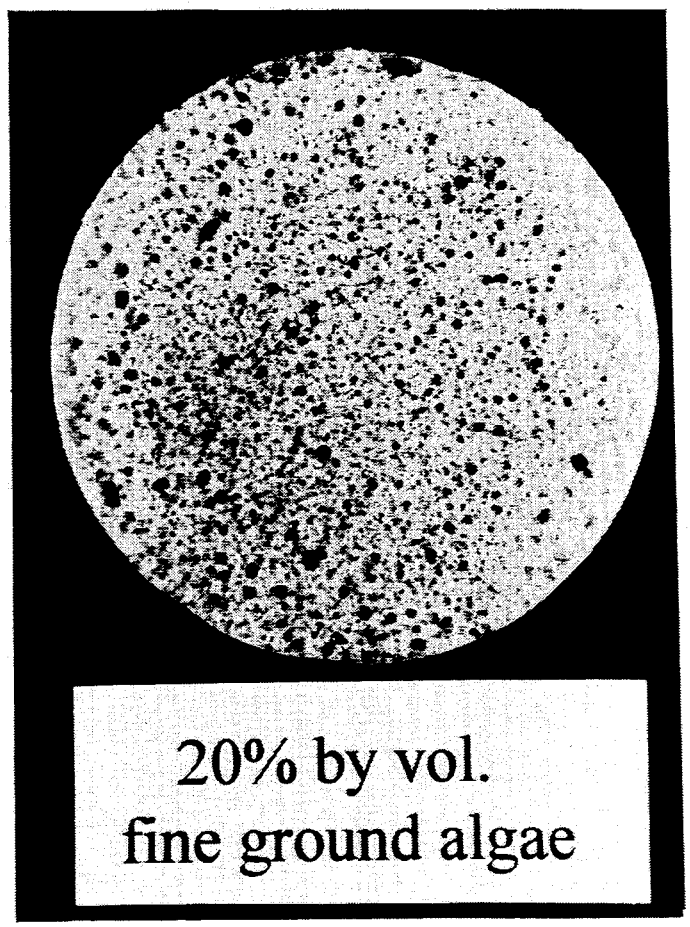
FIG. 1 is a cross-sectional view of a 20% by volume foamed algal plastic generated by a polyurethane foaming method.

The algal fibers and algal plastic resins described herein are well-suited to the formation of both loose and solid packings. Where desirable, the components of the algal plastics can be chosen so as to produce an end product made so as to be almost entirely biodegradable.

The algal fibers, pulps, resins, and plastics described herein are unique structural combinations of cellulose, hemicelluloses, sugars, and proteins. It has been discovered that algae are well-suited as raw materials for molded foams and other plastic applications as they contain polysaccharides such as cellulose, as inherent structural components of the cell walls. In most instances, the cellulose is arrayed in long fibers made up of complex microfibrillar layers. Other materials that can play an important role in certain molding processes are also found in algae, and include sugars rich in hydroxy groups as well as structural glucosamines and proteins.

Among the green algae in the Class Chlorophyceae, the filamentous algae of the order Cladophorales are especially well suited for making the algal plastics of the present invention. These algae have long macrofibrillar structures made up of cellulosic chains, and the underlying structure of these microfibrillar layers is complex and inherently strong. Additionally, algae of the order Cladophorales are particularly rich in cellulose.

Moreover some of these algae, such as *Cladophora glomerata* (L.) Kützing, have become major ecological pests, reaching massive nuisance proportions as a result of eutrophication caused by pollutants in effluent frown industry, agriculture and urban sewage. The organism adversely affects navigation, recreation, water quality, and property values. 30-percent of the aquatic herbicides used in the U.S. are for control of this pest. In addition to the benefits derived from the use of *C. glomerata* as a biodegradable replacement for polystyrene resins in such applications as foamed packing materials, its industrial use further represents an opportunity for cost effective, ecologically responsible pest control. Furthermore, some of the algae useful in generating the algal plastics of this invention may be grown in waste streams and effluent ponds from industrial and domestic waste disposal, and present an opportunity for a new renewable industrial resource to be grown in habitats not currently exploited.

The organisms specified for use for the purposes set forth in this patent application are filamentous green algae of the Division Chlorophyta, Class Chlorophyceae, and Order Cladophorales.

The systematics of the order Cladophorales is summarized as follows. Cladophoraleans are straight chain and branched filamentous plants composed of multinucleate cells. The filaments are attached to the substrate by rhizomes or are free floating. The cells contain numerous discoid angular chloroplasts forming a parietal reticulum, but they may extend into the internal meshes of the protoplasmic foam. The main wall polysaccharide is a highly crystalline cellulose I, forming numerous lamellae of microfibrils in a crossed fibrillar pattern. In at least one species, Pithophora, the outer walls and cross walls contain n-glucosamines (chitin) as well as cellulose I. One or more species may contain silica in their outer cell walls. Reproduction can be by either sexual or asexual means.

The extremely complex and exact system of wall formation in the Cladophorales suggests that deposition is under very precise control and that the production and orientation of microfibrils is a function of the outermost layer of cytoplasm. The set of microfibrils are deposited in the sporeling cells with the first to be deposited making a small angle to the transverse axis, followed by the second at a greater angle, and finally the third, when present. The rhythm of deposition is retained by the daughter cells through several cell divisions so that adjacent cells in a filament have the innermost lamellae lying in the same direction.

Microfibrils normally are synthesized through the formation of terminal synthesizing complexes (TC), containing enzymes and other factors at their growing tip. TC structure determines final microfibrillar assembly in the cell walls of algae. There are two basic forms of these TC's; rosettes and linear.

The interactions of the chemical and physical properties of the cell walls of filamentous green algae provide form, strength and stability. These properties include:
1. Microfibrillar lamellae composed of cellulose I.
2. An amorphous matrix composed of polysaccharides, between the inner and outer walls or the filaments, which surrounds the microfibrillar lamellae.
3. Hemicelluloses concentrated on the outer surfaces of the microfibrils.
4. Chitin and chitosan in the outer and cross walls of some species.
5. Silica in the outer wall of some species.
6. Proteins, glycoproteins and heteropolysaccharides.

In general, the filaments of the cladophoralean algae are composed of cells enclosed by a double cell wall. The inner wall encloses individual cells, while the thinner outer wall ensheathes the whole filament. The mass of the cell wall is made up mostly of microfibrillar elements which provide rigidity and strength. The most common component of the microfibrils is the polysaccharide, cellulose. In the Cladophorales, a highly crystallized form of cellulose, cellulose I (or native cellulose) is present in all the species of the genera Cladophora, Chaetomorpha, Pithophora and Rhizoclonium, whereas it is replaced by cellulose II (a less polymerized form of cellulose with irregularly disposed molecules) in all Spongomorpha spp. The percentage of microfibrillar material in the genus Cladophora is about 28.5%, and in the genus Chaetomorpha is in the range of 36.5–41%.

In the cell wall, cellulose is usually laid down in the form of lamellae running in two directions, in steep or slow spirals, almost at right angles or with a third lamellae, if present, as in some species of Cladophora, Chaetomorpha and Valonia, in which the fibrils run in the obtuse angle between the other two. The third spiral is not always present, in which case the cell wall is a two lamellae repeat. Uniquely, microfibrils are interwoven between different bands of lamellae. The microfibrils of the side walls are continuous with those of the cross wall. The microfibrillar lamellae are in general surrounded by a water soluble amorphous material also composed of polysaccharides.

The polysaccharide composition of cladophoralean cell walls is, in general, as follows:

Cellulose microfibrils—Glucose, galactose, arabinose and xylose.
Water soluble fraction—Uronic Acid, galactose, glucose, arabinose, xylose.
Hemicellulose fraction—Galactoglucomannan, arabinoglucuronoxylan.

Other sugars represent the constituents of glycoproteins and heteropolysaccharide fragments that are linked to each other or to cellulose. Protein related in structure to collagen are also found.

In addition, silica is also found to a small extent in the cell walls of the cotton-mat algae.

The order Cladophorales is defined here to include at least the following genera: Cladophora, Chaetomorpha, Rhizoclonium, Pithophora, Valonia, Valoniopsis, Cladophoropsis, Boergesenia, Anadyomene, Microdictyon, Boodlea, Chamaedoris, and Dictyosphaeria. Because of the taxonomic state of flux, the order Cladophorales is further defined to include any filamentous green alga of the class Chlorophyceae with the cell wall characteristics, general chemical and physical composition, and structure and function as described above. The preferred species with reference to this invention are Cladophora spp., especially *Cladophora glomerata* Kuetzing, Chaetomorpha spp., Pithophora spp., and Rhizoclonium spp.

The species of preference to be harvested under current world conditions of pollution eutrophication is *Cladophora glomerata* Kuetzing. Worldwide, this species has the widest distribution and greatest biomass of all the filamentous green algae. In addition, this species is of the genus having the second highest proportion of cellulose I microfibrils in its cell walls. However, it will be appreciated by those skilled in the art that other Cladophora spp., Chaetomorpha spp., Pithophora spp., and Rhizoclonium spp., all contain cellulose I in their cell walls and can be utilized for the various formulations and applications described below.

For culturing, *Cladophora glomerata* Kuetzing, Chaetomorpha spp., Pithophora spp., and Rhizoclonium spp. will be used preferentially. Pithophora spp, for example, are generally free floating and tend to prefer non-flowing water, which makes them an excellent candidate for culture in polluted effluent pools. Ultimately, however, whichever cladophoralean species is most amenable to being bred or biologically engineered to provide the highest yields of the best quality cellulose and related hydrogen bond-inducing polysaccharides will be used. Strain improvement can be carried out by breeding under standard laboratory conditions of monoalgal culture, or by introducing genes using recombinant manipulation of the genome.

It is the inherent structure of the cladophoraleans that make them particularly suited as fibrous resins for the production of foamed packing materials. The complex microfibrillar structure in the Cladophorales can result in fibers having effective lengths on the order of a meter or more, and can be an important factor in the structural integrity of foamed packing material made from algae. These fibers are comprised primarily of cellulose I, a strong form of the polymer, and may also contain other strong structural materials such as glucosamines. The strength of these fibers is the result of the inherent crossfibrillar structure described above. Furthermore these structure are surrounded by polysaccharide materials and sugars which can participate in stable foaming reactions so as to alleviate any need to substitute synthetic materials such as synthetic polyols. The integral high hemicellulose content of these algae, with its high hydroxyl group content, can be particularly advantageous for this purpose. The water soluble sugars, under dry pulping conditions, may also contribute to various foaming reactions. Even the inherent moisture content of the dried algal resins or pulps can be important to, for example, in steam explosion methods of foaming.

In particular, it is important that articles made from algal plastics retain sufficient strength and dimensional stability to perform their desired function (e.g. sufficient dimensional stability to serve as a packing material), and in some instances, maintain dimensional stability in humid air. For instance, the dimensional stability of the algal foam plastic can be within a range designated by the useful characteristics of extruded polystyrene and expanded polystyrene for the same or similar application as the algal foam plastic is being used in. In many applications, the article must also be recyclable and/or biodegradable after disposal. The tensile and compressive strengths of the final foamed product is not only influenced by the fibrillar structure itself, but can be influenced by the hydrogen bonding capacities of the accompanying hemicelluloses. The polysaccharides within the filamentous structure can also act like inherent polysaccharide glues that can further add cohesiveness to the foamed packing product. Finally, while the porosity and vegetative content of foams made from these algae make them inherently biodegradable, their relative hydrophobicity make them slow to absorb moisture and breakdown in normal use.

In many applications, the foamed algal fiber matrix which is created can have a low water content. In situations where its use requires a low inherent moisture content, the algal plastic can be dehumidified either in a step subsequent to the foaming process, or as part of the foaming process itself. Low moisture requirements may arise, for example, where the packing material will come in contact with moisture-sensitive material during its use, as well as where the stability of the algal fiber matrix is influenced by the moisture-content of the plastic.

For packing materials, the choice of resin to be created can often depend on the desired foaming and forming methodology used to create the algal plastic end products. By way of illustration, if an extrusion method for forming loose packings is used which is similar to the extrusion of polystyrene loose packing, it may be desirable to reduce fiber lengths during a pulping step, and release the hemicelluloses and starches from the algal mass. The ensuing pulp can then be cooked to a temperature where the hemicelluloses form an amorphous mass with the fibers embedded therein and create a relatively translucent resin that can be pelletized so as to contain a sufficient moisture content to explode upon heating in an extruder. If desired, the "popped" algal plastic can then be cut from the mass into shaped loose packings. Similar resins can be generated for use with microwave explosion puffers such as described by the Spratt et al. U.S. Pat. No. 4,990,348, incorporated by reference herein.

For the solid packing materials described herein, any pulping method, such as ones developed for paper and can be used to prepare an algal resin. (See for example commonly assigned U.S. patent application Ser. No. 07/928,978 entitled "Algal Pulps and Prepulps and Products made therefrom, incorporated by reference herein). It will be appreciated that the desired end product can control which particular pulping methodology is selected. Pulping and fiber preparation used in wood and nonwood-fiber processes (see for example *Pulp and Paper Chemistry and Chemical Technology vol I* ed. James Casey (1980) Wiley & Sons, NY;*Papermaking* ed. Francis Bolam (1965) Clowes & Sons, London, chapters 4 and 5; *Chemical and Mechanical Pulping* ed. James Casey (1984) Marcel Dekker, NY; and *Joint Textbook Committee of the Paper Industry* ed. T. Grace and E. Malcolm (1989) TAPPI, Atlanta, incorporated by reference herein) are generally applicable in making the cladophoralean pulps of the present invention. For most algal plastics, the object of pulping will be to maximize the retention of the fibrous structure of the alga. Therefore gentle, largely mechanical methods will generally be desirable. On the other hand, depending on the foaming method used, a pulping process can be employed which is designed to optimally expose or alter the inherent surface chemistry of the various polysaccharide components of the algal fiber. This is especially important, for example, when the method of forming the final foam involves the reacting of the hydroxyl groups of the resin with isocyanate to produce a cross-linked, strong material with a high percentage of algal fiber as its principal component.

Cladophoralean pulps can be produced by mechanical pulping, by gentle chemical action and selective extraction, by biological pulping, or by combinations thereof. The pulping method selected should
1) retain or create the optimum fiber length for the application, and
2) differentially select and/or expose the hemicelluloses and other sugar polymers so as to increase the hydroxyl group ratio or promote optimum hydrogen bonding capacity or increase the total proportion of cellulose in the mix.

Mechanical pulping of the algae can be performed using any of several different mechanical pulping techniques useful in pulping wood and non-wood fibers. Generally, the length of the fiber desired in the algal plastic will determine which process is used, as well as the duration of pulping. Examples of mechanical pulping processes include the use of disc refiners, grinders, and whirling blade blenders. In addition, beating and refining can be carried out on the pulp as a part of the mechanical treatment of pulp. Often these processes are carried out in the presence of water usually by passing the suspension of pulp fibers through a relatively narrow gap between a revolving rotor and a stationary stator, both of which carry bars or knives aligned more or less across the line of flow of the stock. One major effect of beating and refining is to produce an increase in the specific surface of the pulp fibers. The term "beating" is usually applied to the batch treatment of stock, for instance in a Hollander beater or one of its modifications. The term "refining" is used when stock is passed continuously through one or more refiners in series or in parallel. Examples of refiners useful in the present invention include the disk, conical, or wide-angle types.

In addition to mechanical beating processes, ultrasonic treatment of the pulp, using high-intensity sound waves to transfer energy to the pulp fibers, can be utilized for beating.

Examples of chemical processes useful in the present invention for pulping of cladophoralean algae include alkaline sulfite, acid sulfite, neutral sulfite, sulfate (Kraft and Green Liquor), bisulfite, and polysufide. In addition, non-sulfur chemical pulping processes include caustic soda (such as cold soda), soda-AQ (sodium hydroxide and anthraquinone), sodium bicarbonate, and soda-oxygen reactions.

These chemical processes can be combined with mechanical fiberizing or pulp disintegrating steps, such as disc refining or beating, to yield chemimechanical pulping processes. For instance, the algal mass can be soaked in cold sodium hydroxide solution, or treated by an alternate chemical method, for shorter periods of time and/or with smaller proportions of chemicals. The partially pulped algae can then be subjected to a mechanical fiberizing step to produce a finer more dispersed pulp.

Thermomechanical or chemithermomechanical pulping processes can also be used which involve the application of thermal energy in conjunction with mechanical force to the algal mass as a principal pulping means. In the instance of thermomechanical pulping, the pulp produced will generally be of higher fiber length and hemicellulose levels than produced by most chemical and chemi-mechanical pulping techniques.

Further, biological pulping processes comprising the liberation of cellulosic fibrils by enzymatic digestion of the algae can be used to produce the algal pulp. These processes can be utilized to digest non-cellulosic components of the algae, as well as to alter the characteristics of the cellulosic fibers themselves. For example, biological pulping can be carried out by the use of purified or semi-purified enzymes, or alternatively, by treatment with whole microorganisms (both naturally-occurring and engineered) which act to digest components of the algae in the pulp formation process.

In some instances, it may be desirable to produce algal pulps using pulping methods designed to expose the optimal number of hydroxyl groups. Exposure of hydroxyl groups can be accomplished, for instance, by at least partial disruption of the fibrillar structures to expose portions of the microfibrillar elements ordinarily buried in the fiber. When the foaming procedure used to generate the algal plastic comprises a non-polar method, such as urethane foaming, it may be beneficial to use a dry refining/pulping procedure or involve the use of supercritical extraction/reaction conditions. For example, exposure of the hydroxyl groups by dry pulping can be carried out by a blender procedure using a minimum of water. Under those conditions, resins are produced that can be either dried and briefly ground before addition to the foaming mixture, or used as is, depending on the foaming process chosen. For instance, in a production process, a refiner can be used with a narrow blade aperture to accommodate the thinness of algal fibers by passing the suspension of pulp fibers through a relatively narrow gap between a revolving rotor and a stationary stator.

For aqueous foaming methods, wet pulping methods can be employed. For instance, mechanical wet pulping can be used advantageously to preserve more of the hydroxyl-bearing molecules. In some case, it may be advantageous to "soak" the algal fibers in order to swell or expand them. In addition, following refining of the algal fibers, the pulp may be treated chemically or enzymatically to further expose hydroxyl groups of the hemicellulose. It is clear though, that in the instance of non-polar foaming methods, wet pulping techniques can be used with the resulting pulp dried before foaming. Alternatively, for aqueous foaming techniques, dry pulping methods can be used and the pulp subsequently hydrated.

The algal plastics of the present invention may include at least one of an array of plastic additives that can improve the performance of the algal plastic or overcome processing problems. Suitable algal plastic additives include antioxidants, antistatic agents, chemical blowing agents, compatibilizers, flame retardants, heat stabilizers, impact modifiers, water repellents, lubricants, ultraviolet stabilizers, biocides, pigments and colorants, fillers and reinforcement plasticizers, foam stabilizers, and viscosity modifiers. It will be obvious to those skilled in the art to determine under which conditions particular additives will be useful, as well as to what extent a particular additive will effect biodegradability of the ultimate algal plastic.

Antioxidants are well known additives and can help retard the oxidative degradation of the algal plastic or its components. Degradation is often initiated when free radicals are created in the plastic by heat, ultraviolet radiation, mechanical sheer, or metallic impurities. When a free radical is formed, a chain reaction begins which initiates oxidation of the algal plastic components. Reaction of the radical with an oxygen molecule can yield a peroxy radical, which can then react with an available hydrogen atom to form an unstable hydroperoxide and another free radical. In the absence of an antioxidant, these reactions become self-propagating and can lead to degradation of the algal plastic.

Generally speaking, antioxidants useful in the present invention can be categorized into two basic types, primary and secondary. Primary antioxidants intercept and stabilize free radicals by donating active hydrogen atoms. Hindered phenols (e.g. thiobisphenols and alkylidenbisphenols) and aromatic amines represent two types of primary oxidants useful in the present invention. Secondary antioxidants can prevent formation of additional free radicals by decomposing the unstable hydroperoxides into a stable product. Phosphites and thioesters are examples of useful secondary antioxidants. Secondary antioxidants, or synergists, can be used along with primary antioxidants in the algal plastic formulations.

Many of the algal plastics described herein may be inherently antistatic. However, there may be instances where it will be desirable to treat the algal plastic with standard antistatic agents to increase their utilization with electrically-sensitive equipment, such as required in packing for electronic parts. Antistatic agents, when formulated in or coated on the algal plastics of the present invention, can dissipate static electrical charges. Dissipating static electricity can prevent problems such as sparking, dust attraction, or interference during processing. There are two types of antistatic agents which can be employed in algal plastic manufacture, external and internal. External, or topical, antistatic agents can be applied to the surface of the algal plastic thorough techniques such as spraying, wiping, or dipping. Internal antistatic systems can be compounded into the algal resin during processing. These agents can have the ability to replenish the algal plastic's antistatic protection, which might be worn off during handling, through a process called blooming (the migration of the antistatic agent to the algal plastics surface). The internal antistatic agent can thus offer long-term protection against static electrical charges. Useful antistatic agents for the present invention include hygroscopic compounds which absorb moisture from the surrounding air, and create a conductive layer of water on the polymer surface that disperses the charge. Examples of such hygroscopic compounds include quaternary ammonium compounds and amines, and their associated derivatives. Phosphate and fatty acid esters, polyhydric alcohol derivatives, sulfated waxes, ethoxylated and propoxylated aliphatics and aromatics, and other materials can also be used.

Compatibilizers are agents that can provide permanent miscibility or compatibility between otherwise immiscible or partially immiscible components of the algal plastic, thereby creating homogenous materials that do not separate into their component parts. The compatibilizers of the present invention can function as solid polymeric surfactants, in that they promote miscibility by reducing interfacial tension. These compatibilizing agents can be further classified as reactive and nonreactive. Reactive compatibilizers chemically react with the algal plastic systems during compounding, and they are effective across generally broader ranges of systems than are nonreactive types. However, the degree of compatibilization they provide depends strongly upon compounding conditions. Nonreactive compatibilizers, which are often block or graft copolymers interact physically, not chemically, with the components of the algal plastic during compounding.

Flame retardants are chemical compounds that can be physically blended into an algal resin, or can react to become part of the algal plastic. They can be used to treat an algal plastic product so that its resistance to burning is improved or modified. Flame retardants can be chosen so as to interfere with combustion both physically and chemically but not to prevent the algal plastic product from burning when sufficient heat and oxygen are present.

Heat stabilizers can be added to algal resins to prevent thermal degradation, and can be used to extend the usual life of finished products that are exposed to heat. Lubricants, UV stabilizers, and synergistic antioxidants, can frequently be used in conjunction with heat stabilizers.

Impact modifiers/plasticizers can be formulated into algal plastics to improve the resistance of the finished algal plastics product to stress as well as to enhance the appearance and durability of the product and alter characteristics of the algal plastic such as hydrophobicity. These additives are usually elastomeric, although certain types of plastics may also be used. Examples of impact modifiers/plasticizers useful in the present invention include copolymers of acrylic acid, methacrylic acid, crotonic acid, maleic acid, itaconic acid with monomers such as ethylene, vinyl chloride, vinyl esters such as vinyl acetate, vinyl ethers, acrylic acid esters, acrylonitrile, pyrrolidone and other known monomers. Also included are polystyrenes such as methacrylate-acrylonitrile-butadiene-styrene and acrylonitrile-butadiene-styrene; chlorinated polyethylene, polyvinyl alcohols; and ethylene-vinyl acetate. These additives can also accelerate the melting process and improve the rheological and mechanical properties of the melt. Further examples include polyolefines, such as polyethylene, polyisobutylenes, polypropylenes; vinyl polymers such as poly(vinyl chloride), poly(vinyl acetates); polyacrylonitriles; polyacrylates such as polymethacrylates; polyacetals; thermoplastic polycondensates such as polyamides, polyesters, polyurethanes, polycarbonates, poly(alkylene terephthalates); polyarylethers; polyimdies; alkylene/vinyl ester-copolymers; ethylene/vinyl alcohol-copolymers; alkylene/acrylates or methacrylate copolymers; ethylene/ethyl acrylate-copolymers; ethylene/methyl acrylatecopolymers; ABS-copolymers; styrene/acrylonitrile-copolymers; alkylene/maleic anhydride copolymers; acrylamide/a-crylonitrile copolymers. Also included are polyvinyl alcohols, polyvinyl acetatephthates, polyvinyl pyrolidone, poly(alkylene oxides), such as poly(ethylene glycols), poly(propylene glycols), poly(ethylenepropylene glycols), polyisobutylenes, lignin acrylamides, lignin 2-hydroxyethylmethercrylates, organic plasticizers of low molecular mass, such as glycerol, pentaerythritol, glycerol monoacetate, diacetate, or triacetate, propylene glycol, norbitol, sodium diethylsulfosuccinate, triethyl citrate and tributyl citrate and other substances which function in like manner.

In addition, the algal plastics can be combined with fillers and extenders such as oxides of magnesium, aluminum, silicon, and titanium, sunflower proteins, soybean proteins, cotton seed proteins, peanut proteins, blood proteins, egg proteins, rape seed proteins and acetyated derivatives thereof, gelatin, cross-linked gelatin, vinylacetate, and acylated proteins. The proteins may be fibrous proteins which increase the dimensional stability of the algal fiber matrix.

During the pulping process, between 0 and 85% corn, potato, or other vegetable starch can be added as well as polymerizing adjuvants such as polyvinyl alcohol without losing the flexibility and other qualities contributed by the algal fiber to the final product. The term "starch" as used herein includes non-modified starches as for example carbohydrates of natural, vegetable origin, composed mainly of amylose and/or amylopectin. These starches can be extracted from various plants, examples being potatoes, rice, tapioca, corn, pea, and cereals such as rye, oats and wheat. Starches obtained from high gluten-containing sources, such as "sticky" rice (e.g. sweet rice or Mochigome), can be especially advantageous when used in the present invention. The term starch further includes physically modified starches such as gelatinized or cooked starches, starches with a modified acid value, as well as destructurized starches. Further included are starches in which the divalent ions, e.g. $Ca^{2+}$ or $Mg^{2+}$ ions, associated with the phosphate groups have been partially or completely washed out from the starch or alternatively, have been replaced wholly or partially by the same or different mono- or polyvalent ions. Examples of starches useful in the present invention are provided in European Patent Application Publication No. 0,404,727 (Lentz et al.), PCT Application No. PCT/US91/05873 (Cole et al.), U.S. Pat. Nos. 5,095,054 (Gustav et al.), and 4,673,438 (Wittwer et al.), all of which are incorporated by reference herein. Other polysaccharides that contribute their own characteristics to the final product can be added or substituted for starches. These include polysaccharides and modified polysaccharides such as cellulose, methylcellulose, hydroxypropyl cellulose, hydroxyethylcellulose, hydroxypropyl-methylcellulose, hydroxypropylbutylmethylcellulose, sodium carboxymethyl-cellulose, polyvinylpyrrolidone dentonire, agar, dextran, chitin, polymaltose, polyfructose, pectin, alginates, alginic acid and the like, monosaccharides as glucose, fructose, saccharose and the like, oligosaccharides as lactose and the like, silicates, carbonates and bicarbonates, gums such as xanthan gum, gum aribil, and guar gum. In addition, natural fibers, such as cotton, flax and wood pulp, can be added to the algal pulp.

Strength characteristics can also be enhanced by the addition of amino-group bearing materials such as hexosamines, as for example chitin, as well as materials such as lactic and glycolic acids, their polymers, and mixtures of thereof.

To increase hydrophobicity, and dimensional stability while retaining biodegradability other additions to the foaming formulations can be made. For example, such proteinaceous materials such as collagen, gelatin, or curdlan can be added to the formulations.

In some instances, the final algal plastic can be eventually used as feed for livestock or other animals. For instance, foamed packing material, e.g. "peanuts", can be used as feed for cattle, pigs, etc., after its usefulness as a packing agent has expired. In those instances where the ultimate biodegradation is in the gut of an animal, the algal plastic can be nutritionally fortified by adding, for example, proteins, vitamins, minerals, etc. For instance, the addition of casein to the algal plastic can be carried out at the pulping stage, and represents a method for introducing a protein high in essential amino acids into a plastic with the ultimate end goal of providing a feed source for livestock.

For certain applications, for example, food packaging or hot beverage containers, it may be desirable to coat the surface of foamed packings with polymeric materials that will confer a water proof surface, without seriously interfering with their biodegradability. Standard surface coating materials currently in use for paper and/or plastic products can be suitable for coating algal foamed plastics.

Lubricants can be added to algal resins to improve the flow characteristics of the plastic during processing. They can function, for instance, by reducing melt viscosity or by reducing adhesion between metallic surfaces of the processing equipment and melted algal plastic. Polarity, melting point, and solubility in the resin are key considerations when a lubricant is selected. Lubricants that reduce molecular friction, thus lowering the algal plastics's melt viscosity and improving its flow, are referred to as internal lubricants. Substances that promote resin flow by reducing friction of the algal plastics melt as it contacts the surface around it are considered external lubricants. Major classes of lubricants include amides, esters, metallic stearates, waxes, and acids. Examples of suitable lubricants include lipids such as glycerides, wax, fatty acids and salts thereof, as well as stearates of aluminum, calcium, magnesium, and tin, magnesium silicate, silicones, and substances which function in like manner. For example, to improve flow properties of the algal plastic resins, lipids, such as animal or vegetables fats, especially those which are solid at room temperature may be used. For instance, fats can be selected which have a melting point of greater than 50° C., such as the triglycerides of many $C_{12}$, $C_{14}$, $C_{16}$ and $C_{18}$ fatty acids do.

Ultraviolet stabilizers can help algal plastics resist light degradation. If absorbed UV radiation is not dissipated, bonds within the polymer can be broken and a free-radical chain reaction can be initiated, which causes discoloration, embrittlement, and eventual premature degradation of the algal plastic. Thus, most algal plastic products designed for outdoor use can be stabilized with additives that either absorb more UV light than the algal plastic itself or deactivate the harmful free radicals and hydroperoxides as they are formed. Benzophenones and benzotriazoles are two widely used commercial products that do act as UV absorbers, and can be compounded with the algal plastics of the present invention.

Chemical blowing agents, as discussed below, can be used to make foamed algal plastics. Physical blowing agents are volatile liquids or compressed gasses that, because of changes they undergo during processing of the plastic, give the plastic a cellular structure. Gasses, such as nitrogen, carbon dioxide, and air, or low-boiling liquids, such as short-chain hydrocarbons, are dissolved in the algal plastic resin and can be volatilized by the release of pressure or the heat of processing. Chemical blowing agents are solids or liquids that generate gasses when decomposed by the heat of processing, generating a foamed algal plastic product. Chemical blowing agents can be designed to decompose within well-defined temperature ranges that can be lowered by the addition of activating compounds.

It may be desirable under some instances to add biocides to the algal plastic to prevent microbial, fungal, and/or algal growth in either the algal plastic pulps and resins or the final algal plastic product. The biocide can be added directly to the pulp or resin before foaming or formation, or can be used in a post-coating process. Examples of biocides useful in the present invention include methylbenzethonium chloride, benzethonium chloride, chlorhexidine gluconate, alkyl dimethyl ammonium chloride, dialkyl methyl benzyl ammonium chloride, and halogenated hydantoins.

The presence of chlorophyll and other pigmentary molecules in the algae can require a bleaching process in those instances where the coloration of the final plastic product is of importance. Chemical bleaching of the algal pulp can be carried out using many of the same processes found in the bleaching of wood and non-wood-fiber pulps. The actual bleaching process will depend in part upon the pulping process utilized as well as the desired brightness of the final plastic product. Chlorine dioxide, hypochlorites (such as calcium hypochlorite and sodium hypochlorite), bisulfite, dithionite, peroxides (such as sodium peroxide and hydrogen peroxide), hyperchlorous acid, sodium chlorite, ozone, sodium borohydride, and thioglycolic acid are examples of strongly oxidizing or reducing agents useful in bleaching processes for this invention.

In addition to, or as an alternative to the chemical bleaching steps above, a bleached pre-pulp can be obtained by photo-bleaching. The algae are subjected to conditions which are adverse to photosynthesis and cell-growth so as to cause autolysis of chlorophyll-containing chloroplasts. In the presence of optical energy, the algal mass can then be photo-bleached with a large degree of coloration removed. Depending on the brightness sought for the desired paper product, it may be desirable to carry out both photo-bleaching to form an algal pre-pulp, followed by a chemical bleaching step of the algal pulp. The optical energy used for photo-bleaching can be natural sunlight, or alternatively, artificial light of a wavelength suitable to bring about bleaching of the chlorophyll.

To carry out the in situ bleaching (photo-bleaching) of cladophoraleans for the production of pulps, cladophoralean algae, under prevailing natural or artificially simulated conditions, can be harvested when at least a certain fraction of the harvested population has reached maximum growth and their physiological processes have induced the autolysis of chloroplasts as indicated by the reduction of chlorophyll. The percentage of the population needed to attain this growth state before harvesting can be determined based on the particular strain employed as well as end-product needs. For example, this fraction can range from 30-percent to 70-percent of the harvest population.

Once harvested, the cladophoraleans can be allowed to slowly dry out while exposed to the optical energy necessary for photo-bleaching. Sprinklers can be used to control the drying process by keeping the cladophoraleans moist enough to allow physiological processes such as the degradation of the chloroplasts to be maintained. The need for wetting can be determined by the rate of drying, which can be a function of ambient meteorological conditions and the intensity of the sun. The drying process should progress to the point that the algal mass is fully dry, or until autolysis of the chloroplasts is complete as indicated by the loss of green color. If the photo-bleaching of the algal mass is sufficient, the drying step can be suspended and the moist photo-bleached pre-pulp used directly in the pulping stage if desired.

In some instances it may be preferable to harvest the algae and mechanically express the water (i.e. by the use of heat, pressure, or combinations thereof) and transport the material to a processing site. At the processing site, the dried algae can then be photo-bleached with artificial or natural light, either before or after mechanical pulping. The key is to harvest the cladophoraleans at the growth stage, or to provide a physiological stimulus to trigger, or make susceptible to autolysis, the chloroplast bodies.

A cellular plastic or plastic foam is defined as a plastic, the apparent density of which is decreased substantially by the presence of numerous cells disposed throughout its mass. While the nomenclature of cellular polymers is not standardized, they are often classified according to the properties of the base polymer, the method of manufacture, the cellular structure, or some combination of these. Cellular plastics or plastic foams consist at a minimum of two phases, a solid phase and a gaseous phase derived from a inherent gases or a blowing agent. The creation of foams requires a system of bubble formation, growth, and stabilization, and usually requires a depressant of surface tension, and chemical means of stabilizing the final product (for example, by cross-linking of the polymeric phase), to increase the viscosity of the solid phase, and reduce surface access to the adsorbed phase.

Expanded algal plastics of the present invention can generally be identified as being one of two structural configurations:
 (a) the closed-cell type, in which each individual cell is completely enclosed by a wall of plastic, or
 (b) the open-cell type, in which the individual cells are intercommunicating.

The algal plastic foams can be rigid, semi-rigid or flexible. In addition to being effected by the composition of the algal plastic, the properties of the end product can also be effected by the type of process used (e.g. casting, extrusion, injection molding).

The production of cellular foams depends upon the degree of polymeric rigidity, the foaming agent, and the technique used. In general, there are many well understood techniques in the state of the art for producing cellular plastics that can be used to produce the algal cellular plastics of the present invention.

The following are examples of methods useful for producing cellular algal plastics:
 1. Air or other gases are mechanically mixed (whipped) into an algal plastic suspension;
 2. Gases dissolved in the algal plastic suspension are vacuum expanded under reduced to pressure;
 3. A component of the algal plastic suspension is volatized by heat;
 4. A chemical blowing agent, which produces a gas by a chemical or thermal decomposition reaction, is mixed with the algal plastic suspension;
 5. A cross-linking agent which produces gas is mixed wish the algal plastic suspension;
 6. Soluble crystals or expanded beads or resins are added to the algal plastic suspension.

One method of foaming, "whipping", can be carried out by mechanically separating the algal fibers and aerating the pulp. The fibers may then be allowed to settle before curing the pulp to form the stabilized plastic, or alternatively, the whipped pulp can be stabilized to advantageously retain the aerated structure. If the average fiber length is relatively large, the fibers may pack inefficiently and form a foam upon settling. The choice between allowing the aerated pulp to settle will be at least in part determined by the desired density of the algal plastic.

This process can be accomplished by using the fibers directly or by derivatizing the cellulose. In the first case, the plant may be digested to produce a concentrated mixture of cellulose and hemicellulose fibers. An aqueous solution (such as an alkaline solution) may be used for the digestion process. After the digestion, the fibers can be allowed to settle, resulting in the interlocking and kinking of fibers. The level of foaming can be controlled by factors such as the degree of mechanical whipping, the length of the fibers of the pulp, and the use of surfactants and aerating and whipping agents.

Stabilization of the foam as a cellular plastic can be accomplished as simply as drying the foam. The interlocking of the algal fibers, both mechanically and by hydrogen bonding, can act to give substantial dimension stability to the final foamed plastic. To increase stability, glues and adhesives can be added to the algal suspension prior to whipping. For instance, the fibers can be coated with a low melting polymer (for example, polyvinyl alcohol), and a crosslinking agent, or alternatively, an adhesive dissolved in a solvent. Fusion occurs with contact between "tacky" fibers and the cellular structure of the foam can be maintained. In some instances, because of surface tension and capillary effects, the coated substance may migrate to the ends of the fiber and produce an anchored network.

Vacuum expansion of algal plastics relies on the expansion of gases or vapors (such as physical blowing agents) present in the algal suspension when a reduced pressure is applied to the pulp. (see for example Gardon et al. (1961) *Textile Research Journal*, 31:160, incorporated by reference herein). For instance, dry ground algal fibers can be mixed with a solvent, surfactant, and foam stabilizer, and the mixture thoroughly mixed and placed in a molding die. Pressure is applied on the die while it is heated (i.e. to about 150° C.) by application of steam heat. After a predetermined time, the pressure is released and the mixture allowed to expand.

The volatilization of a component of the algal pulp can also be used to form a cellular foamed plastic. For instance, the use of heat, either generated by an exothermic reaction between components of the pulp or externally applied to the system, can be used to volatize a component of the pulp. The expansion of the volatized component causes the formation of a foam. For instance, the volatile component can be water that is present in the pulp. The steam can act to expand the pulp and form a cellular plastic. In one aspect of the invention, a foamed plastic "starter" material can be generated by heating a dry ground or wet pulped algal resin to about 95° C. or until the starch or pectinaceous components of the algal fiber have reached an amorphous, gel-like state. The cellulose fibrils are thus surrounded by the amorphous material, and the material is dried to a predetermined humidity. The dried material, which can be in the form of pellets, can then be subsequently steam exploded using extruders or microwaver puffers which heat the remaining water in the pellets, forming steam and "popping" the pellets. In another aspect of the invention, the algal fibers can be optionally mixed with other additives (e.g. starch, water) and directly foamed by microwave or heat extrusion (e.g. via a screw extruder).

Blowing agents are compounding ingredients in the algal plastic which also allow the formation of expanded (cellular) algal plastics. The most convenient way of expanding algal plastics using blowing agents is to incorporate into the resin a compound that generates a gas upon thermal decomposition or as the result of a chemical reaction. Blowing agents useful in the present invention include both organic and inorganic blowing agents. Organic blowing agents will generally be desired when the foamed algal plastic is to have a closed-cell structure. In contrast to "soda" (sodium bicarbonate) and other inorganic blowing agents, organic blowing agents are often better suited for producing fine, closed cell structures.

Generally, organic blowing agents are organic compounds that are stable at normal storage and mixing temperatures, but undergo controllable gas evolution at reasonably well-defined decomposition temperatures. The organic blowing agents that are available vary widely in their properties. Importantly, they vary in the temperature at which they produce gas, and in the nature of their decomposition products. The agents may also vary in their response to other material present in the expandable algal plastic which may function as activators or retarders. Blowing agents which release nitrogen are most preferred, as nitrogen is an inert, odorless, nontoxic gas. However, other gas-producing blowing agents can be used to produce, for instance, carbon dioxide or oxygen. Examples of blowing agents useful in the present invention include Azodicarbonamide, Dinitropentamethylene tetramine, Benzene Sulfonyl Hydrazide, p-Toluene Sulfonyl Hydrazide, p,p-Oxybis(Benzene Sulfonyl Hydrazide), 5-phenyl Tetrazole, and sulfonyl semicarbazides. It is well known that conditions such as moisture and the chemical composition of the plastic can effect the decomposition temperature of a blowing agent. Further, decomposition temperatures can be adjusted up or down using a variety of activators or retarders.

The processes described above are most suitable for pulps having average fiber lengths that are long. When the algal fibers are short, however, a crosslinking technique can yield better results for forming the cellular plastics. A cross-linking agent and a solvent may be needed for the foaming. Potential cross-linking agents include diisocyanate, Glutaraldehyde, melamine formaldehyde and urea formaldehyde. During the foaming process, metered amounts of crosslinking agent can be fed into a reaction chamber containing the fiber and the solvent. The mixture can then have heat and/or vacuum applied to vaporize the solvent and yield a foamed structure. Appropriate amounts of foam stabilizers such as $Na_2SiF_6$ and Si and Al compounds can be useful to stabilize the cell structure of the algal plastics.

With particular regard to the use of isocyanates as cross-linking agents, the algal plastics of the present invention can be made using isocyanate base techniques, which are similar or analogous to polyurethane foaming methods. Polyurethane foams are prepared by reacting hydroxyl-containing compounds (polyols) with an isocyanate. The polysaccharides of the algae can serve as a source of hydroxyl-containing fibers for cross-linking and incorporated into isocyanate base generated foams in several forms:

(a) unmodified,
(b) derivatized,
(c) depolymerized and derivatized, and
(d) converted to non-carbohydrate polyol.

The later chemical modification can be carried out concurrently with or subsequent to a pulping step. Additionally, other polyols can be added to the pulp, such as polyether polyol. Toluene diisocyanate (TDI), diphenylmethane diisocyanate (MDI) and polymethylene polyphenyl isocyanate (PAPI) are examples of isocyanates useful in urethane-like (isocyanate base) reactions to form the algal plastics.

In the production of isocyanate base foams, two reactions occur. The first is a reaction of the isocyanate with the hydroxyl groups of the polysaccharides of the algal pulps to create inter-chain linkages. The second reaction, which generates the blowing gas and produces the expanded foam structure, may be chemical or physical in nature. In the chemical reaction, the polymeric structure of the foam is formed by the reaction of the isocyanate with the polysaccharides. Simultaneously, the isocyanate reacts with water contained in the reaction mixture to form an intermediate product, carbamic acid, which decomposes to give off carbon dioxide as a blowing gas to expand the matrix. The physical reaction involves the volatilization of a blowing agent (i.e. an inert, low boiling chemical) to provide expansion. A blowing agent can be added to the formulation and the foamed structure formed by volatilization of the blowing agent under the exothermic heat produced by the polysaccharide-isocyanate reaction.

Foamed algal plastics can also be formed by the addition of soluble crystals or expanded beads or resins to an algal pulp. For instance, the cellulose can be derivatized in an alkaline (NaOH) solution, and $Na_2SO_4$ crystals added to the thick suspension that forms. These crystals can become suspended and entrapped in the thick slurry of the pulped fibers. At this point, $H_2SO_4$ can be added to precipitate the cellulose structure. The $Na_2SO_4$ crystals suspended in the cellulose can then be washed away with water to yield a semiporous open cell foam structure. The size of the foam cell may be controlled by controlling the size of the crystal.

If dissolution of the cellulose is not desirable, a pulp of the material can be made. The $Na_2SO_4$ crystals can be added to this pulp. The fibers may settle in a viscous liquid and produce mechanical interlocking as indicated before. The $Na_2SO_4$ crystals can then be washed away with water to yield the foam structure. A surfactant and a foam stabilizer may be used to enhance the foam structure. Other crystals may also be used instead of $Na_2SO_4$.

EXAMPLE 1

Algal plastic resins can be produced from cladophoralean algae by dry-grinding the algae to uniform granulation. To produce a satisfactory resin, 5 gms of previous air-dried *C. glomerata* Kuetzing was placed in a Waring laboratory blender and stirred, optimally for 5 seconds, at the slowest possible speed, to produce a loose, non-agglomerated fiber. When observed by eye or with the scanning electron microscope, no obvious damage to the fiber was observed except for shearing.

EXAMPLE 2

Algal plastic foams were generated using isocyanate and the addition of polyol to an algal pulp. This technique relies on the isocyanate base techniques described above to develop a foam from the reaction of the hydroxyl groups of the algal fibers and the polyol, with an isocyanate. The algal resin was reacted with a polyether polyol and an isocyanate mixture (MONDUR MR (LIGHT) (4,4'-diphenylmethane diisocyanate; diphenylmethane diisocyanate, and higher oligomers of MDI) to produce cross-linking and thereby obtain a rigid, foamed structure. A blowing agent (pentane) was used to produce the foam and a catalyst (dimethyl ethanolamine) was added to accelerate the reaction.

Appropriate amounts of the raw material were mixed together at room-temperature in a container or appropriate mold. For example, to produce an algal urethane foam comprising approximately 40-percent (v/v) algae, 28% polyol, 40% ground dried algae (*C. glomerata* Kuetzing), 4% catalyst, 5% pentane and 23% isocyanate, all expressed in vol/vol percentage, were mixed together. After mixing, the algal pulp begins to rise and produce a foamed structure. The rate of foaming could be adjusted by controlling the amount of catalyst. In this example, typical foaming times were controlled to be on the order of about 3 to 15 minutes. The percentage of algae used in a particular reaction can be adjusted to suit the particular application needs. As described above, to produce an algal urethane foam comprising approximately 70-percent (v/v) algae, 16% polyol, 66–70% ground dried algae, 2% catalyst, 3% pentane and 13% isocyanate were used in the foaming reaction. Importantly, when the foaming reaction was carried out in the absence of algal fibers, no plastic foam was generated.

Figure 2:
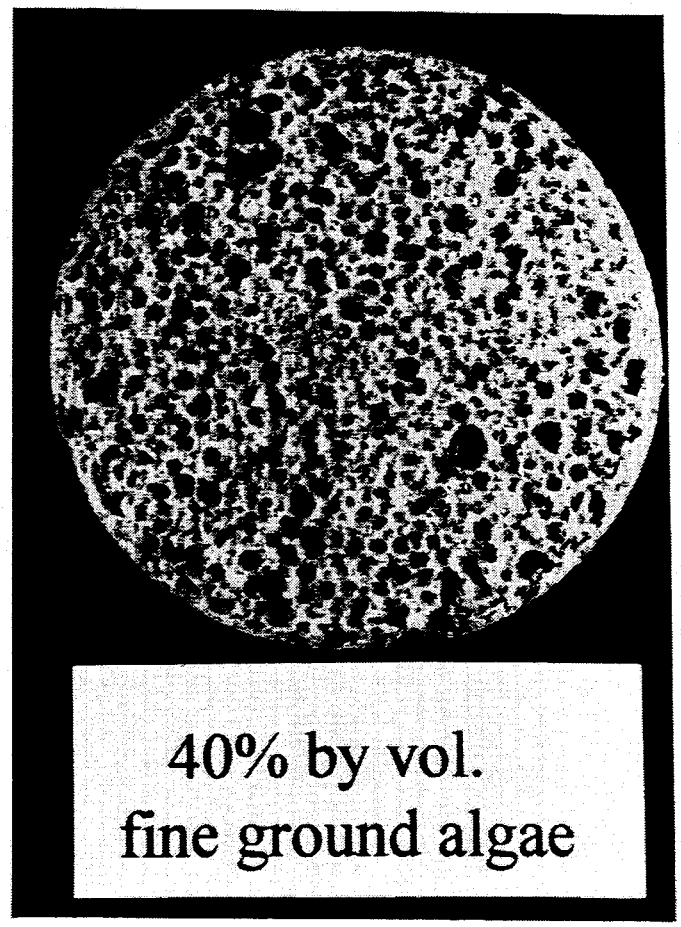
FIG. 2 is a cross-sectional view of a 40% by volume foamed algal plastic generated by a polyurethane foaming method.
Figure 3:
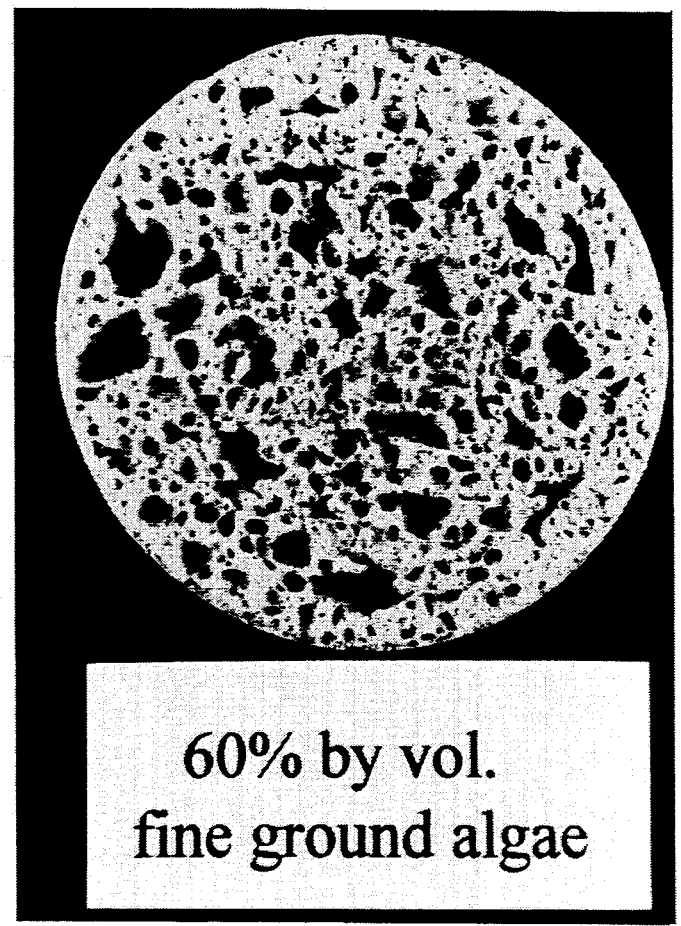
FIG. 3 is a cross-sectional view of a 60% by volume foamed algal plastic generated by a polyurethane foaming method.
Figure 4:
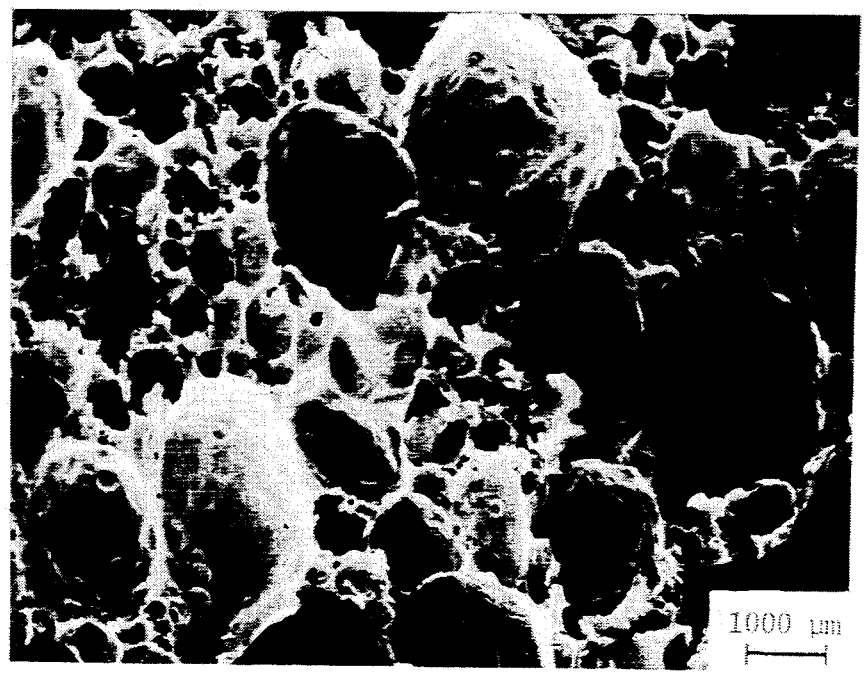
FIG. 4 is an micrograph of the surface of a 20% by volume foamed algal plastic generated by a polyurethane foaming method.
Figure 5:
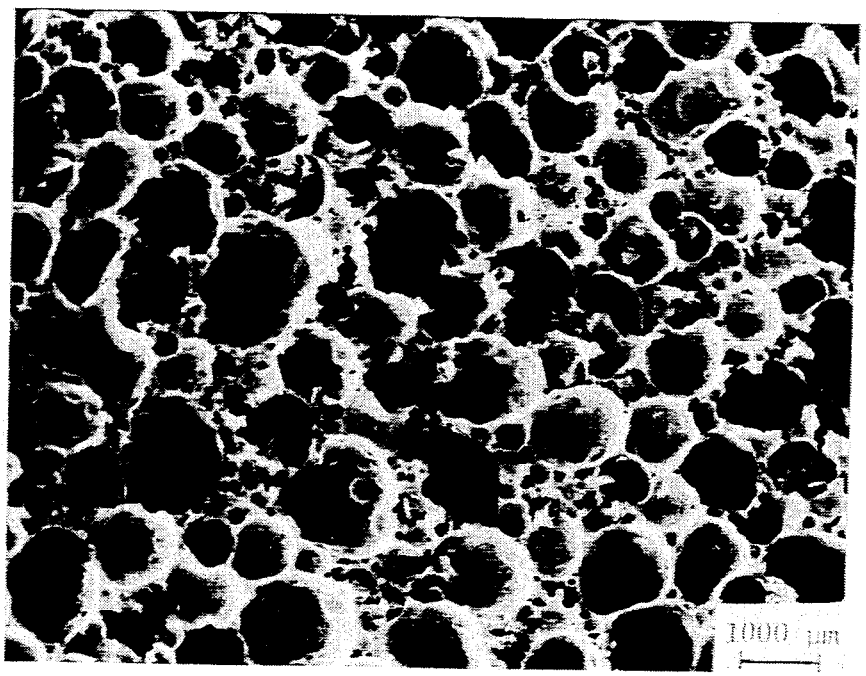
FIG. 5 is an micrograph of the surface of a 40% by volume foamed algal plastic generated by a polyurethane foaming method.
Figure 6:
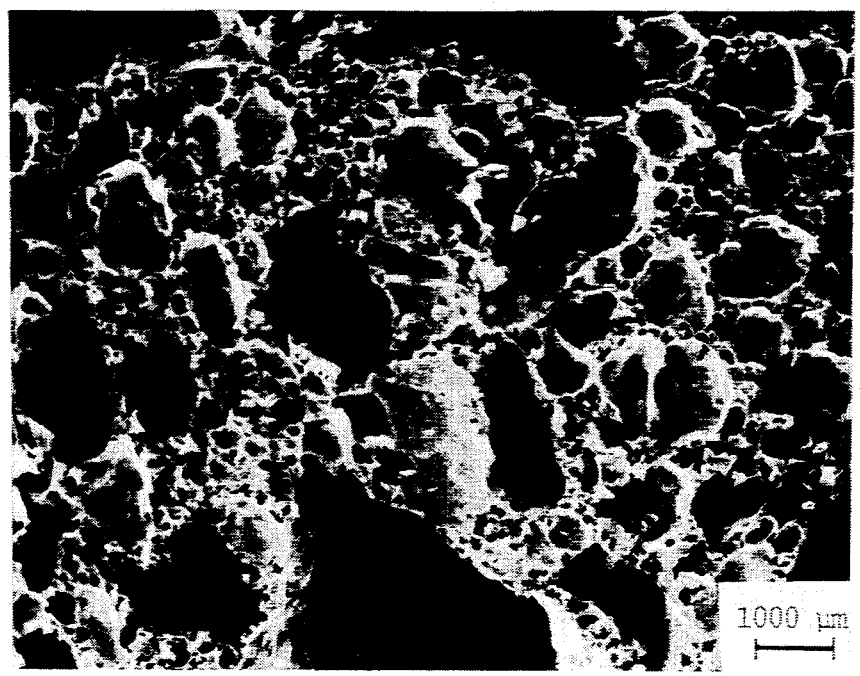
FIG. 6 is an micrograph of the surface of a 60% by volume foamed algal plastic generated by a polyurethane foaming method.

FIGS. 1–3 show the cross-sectional profile of algal foams generated by the polyurethane foaming method described in this example. FIG. 1 is of the foamed algal plastic having a 20% by volume fine ground algae component. FIG. 2 is of the algal plastic produced using 40% by volume finely ground algae. FIG. 3 is of the algal plastic produced using 60% by volume finely ground algae. Each of the foamed algal plastics were of the closed-cell type. FIGS. 4,5 and 6 are micrographs of a surface of the algal plastics shown in FIGS. 1-3.

Figure 7:
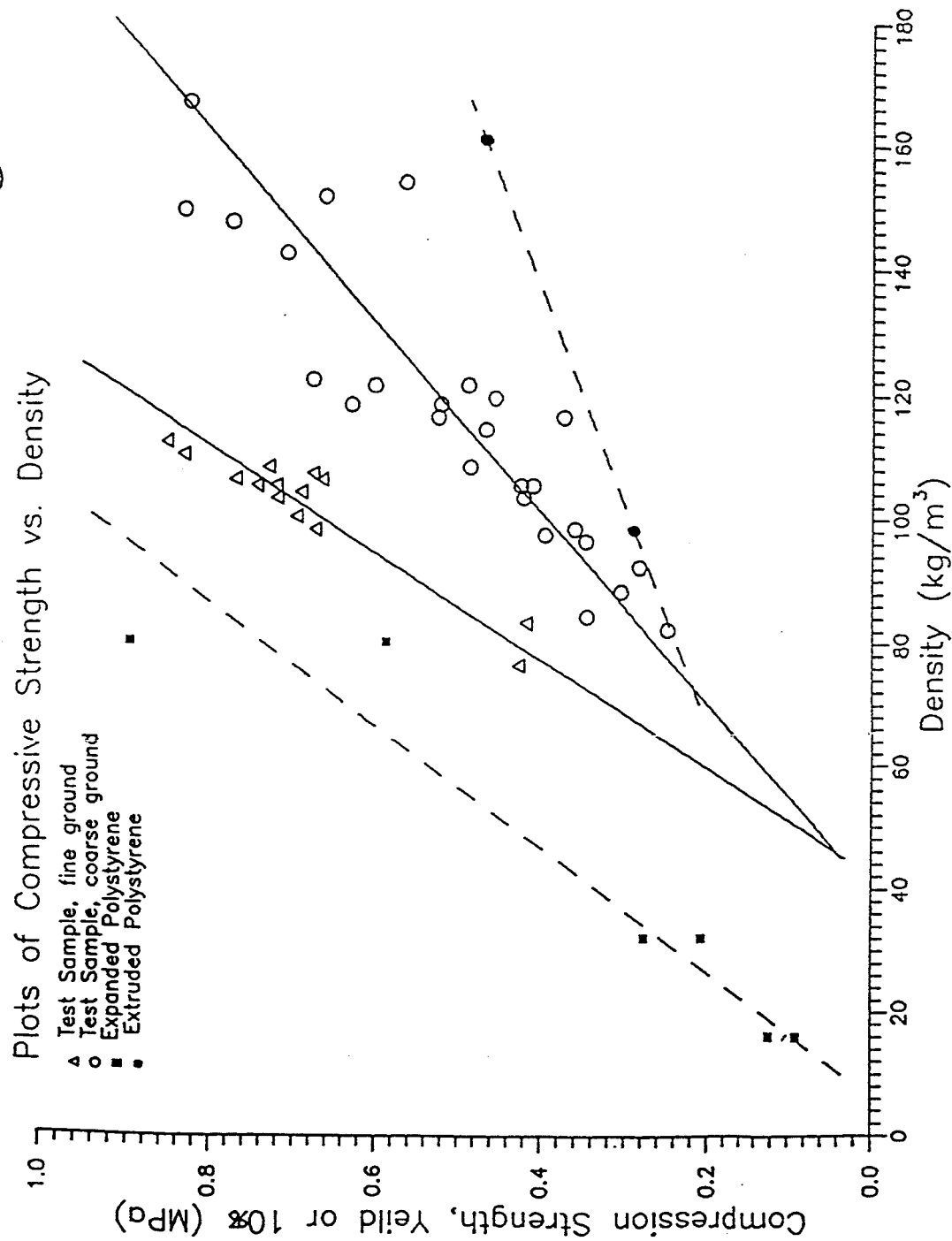
FIG. 7 is a plot of the compressive strength versus density of 40% by volume algal plastic foams of different densities, the algal plastics generated by a polyurethane foaming method. Compressive strength data from algal plastic samples generated by using finely ground algae are indicated by (△), and compressive strength data for plastics generated with coarsely ground algae are represented by (○). Also included in the plot are data values for expanded polystyrene (■) and extruded polystyrene(●).
Figure 8:
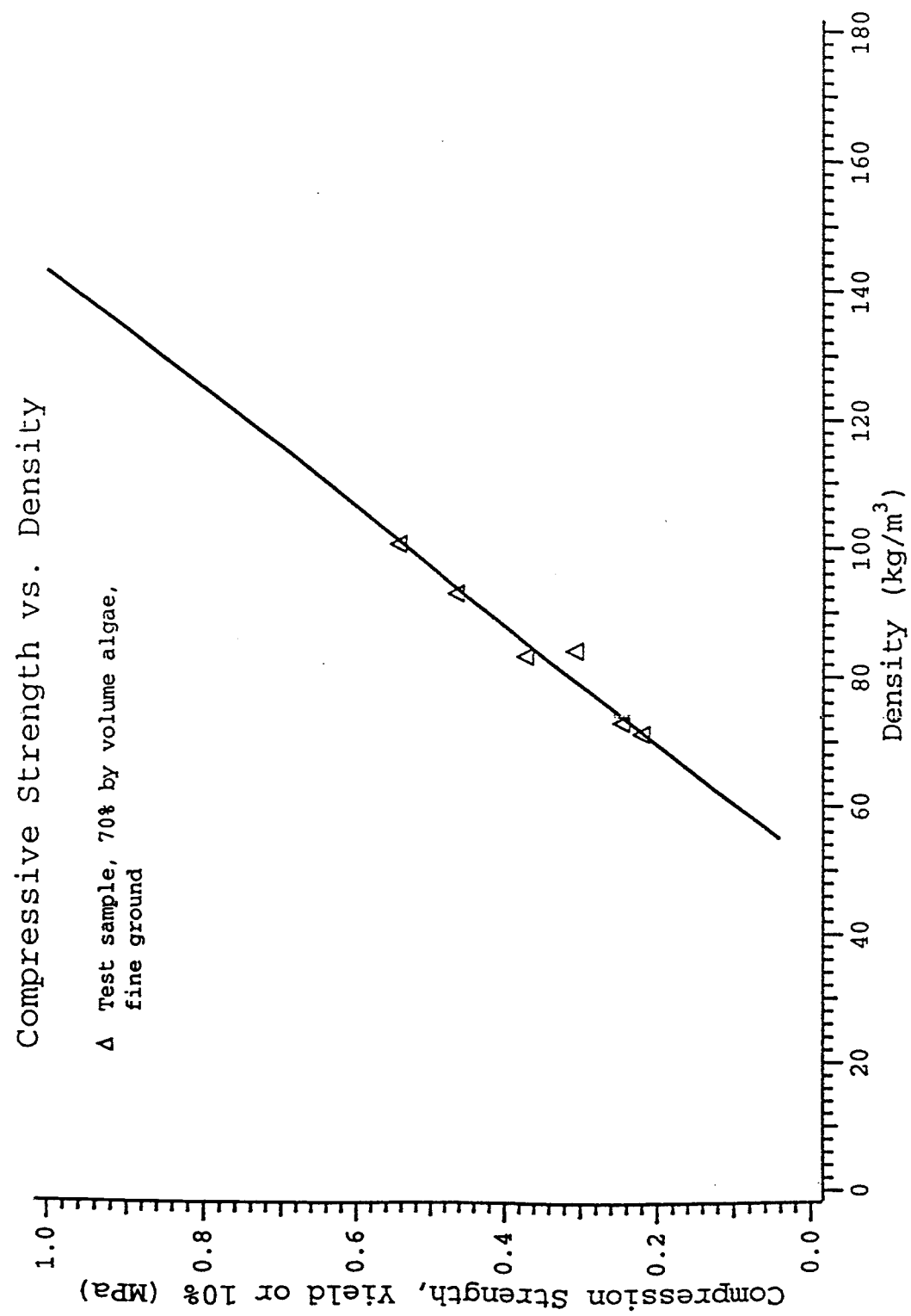
FIG. 8 is a plot of the compressive strength versus density of 70% by volume algal plastic foams of different densities.
Figure 9:
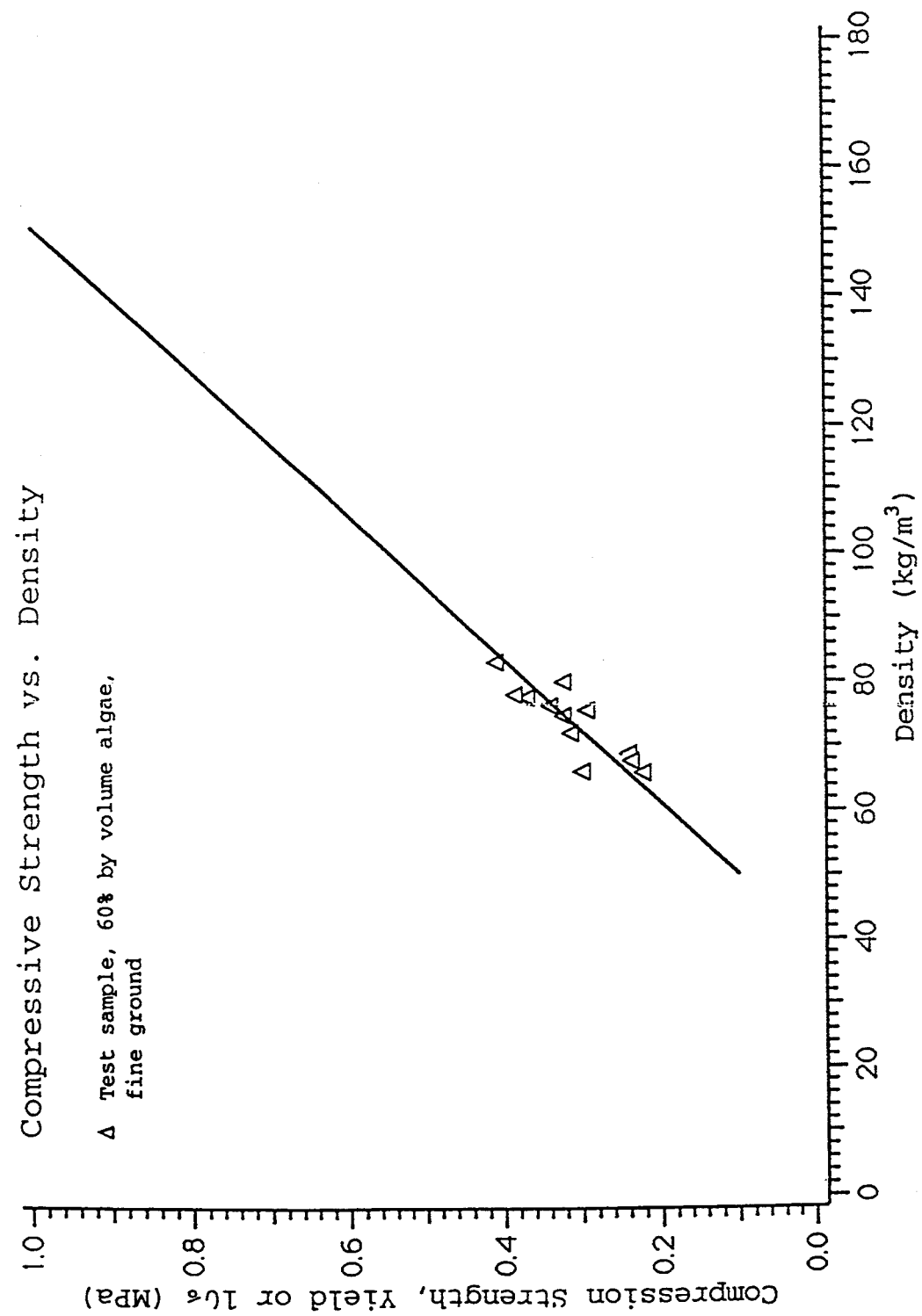
FIG. 9 is a plot of the compressive strength versus density of 60% by volume algal plastic foams of different densities.

The foams produced by this technique were quite rigid, and resilient, and highly resistant to impact. Their qualities appeared to be similar to that of polystyrene packing foams. Algal foams produced by this procedure have measured compression profiles (e.g. compressive strength and compression modulus) that are within the range expected for polystyrene foams. For example, FIGS. 7-9 show plots of the compressive strength versus density of a 40%, 70% and 60% by volume algal plastics produced by isocyanate base foaming methods. FIG. 7 also includes the compressive data for extruded and expanded polystyrene. The rigidity (i.e. rigid or soft) of the final foamed product can be influenced by the percentage of algal material used, as well as the percentage of other additives utilized, such as the amount of polyol, isocyanate, etc. Typical densities were estimated to be on the order of 0.08 to 0.15 g/cm$^3$. Furthermore, it was noted that the amount of polyol used can effect the compressibility of the foamed material and that at higher amounts of polyol (e.g. greater than about 35-percent v/v), the foamed material exhibits soft foam characteristics. Also, when the blowing agent is increased, the amount of porosity in the foam increases. At very high additions of blowing agents, the pore size also increases and the foam becomes very brittle.

To achieve successful foaming it may be necessary to determine the hydroxyl number of the algal pulp, and to know accurately the hydroxyl number of the polyol used. Techniques for measuring the hydroxyl number are well known in the art.

The isocyanate base foaming method described above was also utilized in reaction injection molding processes. For instance, metered quantities of the reactants were added to a polyethylene mold and allowed to undergo reaction (foaming) in the mold. The resultant molded algal plastics were similar in attributes to those foams produced outside of closed molds. Lubricants were also used in the injection molding, including the use of fatty acids, to aid in the release of the molded algal plastic from the mold.

EXAMPLE 3

Algal plastics were formed by foaming methods using isocyanate and wet-pulped algal resins. Foams similar to the foams described in Example 2 can be produced with wet-pulp algal resins, in which the number of available hydroxyl groups has been significant increased. In such pulps the ratio of algal pulp to polyols increase proportionately to the number of exposed hydroxyl groups.

It is also possible to replace synthetic polyols with starch. Initial experiments have been conducted, for instance, with corn starch and "sticky" rice starch. We have replaced a major portion of the polyol with uncrosslinked starch. For example, 35 g of starch was added to 80 g of water and heated to 95° C. to its gel-like condition. This starch gel was used to replace at least a portion of the polyols in the reactions described in EXAMPLE 2. Under these conditions rind foams were produced.

EXAMPLE 4

Several foaming techniques have been utilized that serve to eliminate isocyanate and replace it with more biocompatible products. In this example, dry pulped algae (*C. glomerata* Kuetzing) were mixed with glycolic acid, a pentane blowing agent, and in some instances, with a small quantity of a foam stabilizer (e.g. diphenyl guanidine). The mixture was then allowed to foam under vacuum. When the vacuum is applied, the mixture begins to rise rapidly and remain stable The foams produced by this process contain only algae and glycolic acid, which are both biodegradable.

EXAMPLE 5

Microwave popped algal foams were produced by a number of methods. For instance, a mixture of 4 g algal powder (approx. 60% v/v), 33 g starch, and 4 g baking soda was mixed with 80 mls water and allowed to stand for 15-20 minutes at room temperature. The mixture was then microwaved for 1 minute in a 600 watt microwave at a setting of high.

In some instances, small quantities of a foam stabilizer, such as diphenyl quanidine, was added to the algal resin prior to foaming.

EXAMPLE 6

Algal foams have been produced by the use of screw extruders. For instance, an algal resin mixture (e.g. in the range of 40-80% algae v/v) including a blowing agent was added to the hopper of the injection molder. The screw extruder, at 50 mPa and a temperature of 100°-150° C., had a plastizing effect on the algal resin. The screw drive pushed the resin mass into a mold under the above pressure. The pressure was then released and the mold removed from the unit and the molded algal plastic extracted from the mold.

Alternatively, when water is used as the blowing agent, the algal resin mixture can be extruded in the form of a rod or pellets and then subsequently foamed by application of heat sufficient to vaporize the residual water and "pop" the pellet or rod. For example, the extruded resin mass was cut into pellets and the pellets heated in a 600 watt microwave and puffed by the vaporization of the residual water in the pellet. Expansion of the extruded resin to the foamed algal plastic pellets (i.e. peanuts) can consist of, for example, a change in volume on the order of 300-400 percent. The amount of foaming could be controlled by varying the water content of the pellets before the microwave expansion. Additionally, the pellets could be fed into the hopper of an extruder and puffed by the heat applied to the pellets and the foamed plastic extruded in the form of peanuts or as a molded plastic.

EXAMPLE 7

The use of injection molding techniques for algal foamed packings is highly desirable. For example, gas injection molding processes have been used successfully for long fibers embedded in amorphous matrices.

Experiments were conducted to determine whether the algal pulps would behave well under the high temperature necessary for injection molding, and to generate appropriate parameters for injection molding. Samples of algae were subjected to temperatures of up to 400° C. The effects of heat on the algae were analyzed by thermogravimetric analysis. The results indicate that when the algae is heated, the first weight loss occurs at about 58° C. This weight loss peaks at 63° C. and ends at 82° C. At this point the total weight loss is about 5%. As the algae is heated further, there is no major weight loss until 222° C. This reaction peaks at 254° C. and ends at 272° C. At this temperature, the total weight loss is about 15%. As the algae is heated further, there is gradual weight loss and at 400° C., the total weight loss has been measured to be 55%.

Equivalents

Those skilled in the art will recognize, or be able to ascertain using no more than routine experimentation, numerous equivalents to the specific procedures and compositions described herein. Such equivalents are considered to be within the scope of this invention and are covered by the following claims.

What is claimed:

1. A foamed packing material comprising a foamed and stabilized filamentous algal fiber matrix having substantial dimensional stability.

2. The foamed packing material of claim 1, further comprising an application additive selected from the group consisting of antioxidants, antistatic agents, compatibilizers, flame retardants, heat stabilizers, water repellents, impact modifiers, lubricants, ultraviolet stabilizers, biocides, pigments, colorants, fillers, impact modifiers/plasticizers, foam stabilizers, viscosity modifiers, and combinations thereof.

3. The foamed packing material of claim 2, wherein said application additive is admixed with an algal pulp during a process of generating said algal fiber matrix.

4. The foamed packing material of claim 2, wherein said application additive is used to coat said algal fiber matrix in a post-coating process.

5. The foamed packing material of claim 1, further comprising an additional polysaccharide component.

6. The foamed packing material of claim 5, wherein said additional polysaccharide component is selected from the group consisting of unmodified vegetable starches, modified vegetable starches, alginates, glycosaminoglycans, hexosamines, pentosans, guar gums, cellulose, methylcellulose, hydroxypropyl cellulose, hydroxyethylcellulose, hydroxypropylmethylcellulose, hydroxypropylbutylmethylcellulose, sodium carboxy methylcellulose, polyvinyl-pyrrolidone bentonite, agar, dextran, chitin, polymaltose, polyfructose, pectin, and combinations thereof.

7. The foamed packing material of claim 1, further comprising a high gluten starch.

8. The foamed packing material of claim 1, further comprising a protein component.

9. The foamed packing material of claim 8, wherein said protein component comprises a fibrous protein which increases the dimensional stability of said algal fiber matrix.

10. The foamed packing material of claim 8, wherein said protein component comprises a dietary source of protein for digestion by an animal.

11. The foamed packing material of claim 1, further comprising an additional impact modifier/plasticizer.

12. The foamed packing material of claim 11, wherein said additional plasticizer is selected from the group consisting of polyethylenes, polyisobutylenes, polypropylenes, poly(vinyl chlorides), poly(vinyl acetates), polyvinyl alcohols, polystyrenes, polyacrylonitriles, polyvinylcarbazols, polyamides, essentially water-insoluble poly(acrylates), essentially water-insoluble poly(methacrylates), poly(lactic acids), poly(hydrobutyrate-co-hydroxyvalerates), methacrylate-acrylonitrile-butadiene-styrene, acrylonitrile-butadiene-styrene, chlorinated polyoethylene, polyvinyl alcohols, ethylene-vinyl acetate, polyolefines, polyacetals, thermoplastic polycondensates, polyarylethers, polyimdies, alkylene/vinyl ester-copolymers, ethylene/vinyl alcohol-copolymers, alkylene/acrylates coploymers, methacrylate coploymers, ethylene/ethyl acrylate-copolymers, ethylene/methyl acrylate-copolymers, ABS-copolymers, styrene/acrylonitrile-copolymers, alkylene/maleic anhydride copolymers, acrylamide/acrylonitrile copolymers, polyvinyl acetatephthates, polyvinyl pyrolidone, poly(alkylene oxides), poly(propylene glycols), poly(ethylene-propylene glycols), polyisobutylenes, lignin acrylamides, lignin 2-hydroxyethylmethcrylates, glycerol, pentaerythritol, glycerol monoacetate, diacetates, triacetates, propylene glycol, sorbitol, sodium diethylsulfosuccinate, triethyl citrate, tributyl citrate, and mixtures thereof.

13. The foamed packing material of claim 1, wherein said algal fiber matrix is derived from an algal pulp generated from filamentous algae selected from the division Chlorophyta.

14. The foamed packing material of claim 13, wherein said filamentous algae is selected from the order Cladophorales.

15. The foamed packing material of claim 13, wherein said filamentous algae is *Cladophora glomerata* Kuetzing.

16. The foamed packing material of claim 1, wherein each component of said packing material is selected so as to render said packing material substantially biodegradable.

17. The foamed packing material of claim 1, wherein said algal fiber matrix is formed in a shape of a molded packing.

18. The foamed packing material of claim 1, wherein said algal fiber matrix is formed in a shape of a packing particle.

19. A foamed packing material comprising a foamed and stabilized algal fiber matrix having substantial dimensional stability, said fiber matrix comprising filamentous algal fibers and starch, wherein said foamed packing material is substantially biodegradable.

20. The foamed packing material of claim 19, wherein said starch comprises a high gluten starch.

21. A foamed packing material comprising a isocyanate foamed and cross-linked filamentous algal fiber matrix having substantial dimensional stability.

22. A method of forming a foamed packing material comprising subjecting a filamentous algal pulp to a foaming process which results in a foamed algal fiber matrix having substantial degree of dimensional stability.

23. The method of claim 22, wherein said foaming process comprises an isocyanate based foaming technique to generate said foamed algal fiber matrix.

24. The method of claim 23, wherein said isocyanate base foaming technique comprises admixing with said algal pulp an amount of an isocyanate, a catalyst and a blowing agent sufficient to generate said foamed algal fiber matrix and cross-link said fibers of said foamed algal fiber matrix to provide a substantial degree of dimensional stability.

25. The method of claim 24, wherein said foaming process further comprises admixing with said algal pulp an additive selected from the group consisting of a polyol, a starch, and a combination thereof.

26. The method of claim 25, wherein said starch is a high gluten starch.

27. The method of claim 22, wherein said foaming process comprises volatilizing a volatile component in said algal pulp.

28. The method of claim 27, wherein said volatile component is volatilized by the application of thermal energy to said algal pulp.

29. The method of claim 28, wherein said thermal energy is applied to said suspension using a thermal energy source selected from the group consisting of a microwave system and an extruder system.

30. The method of claim 27, wherein said volatile component is volatilized by thermal energy generated by an exothermic reaction occurring in said suspension.

31. The method of claim 27, wherein said volatile component is water.

32. The method of claim 27, wherein said volatile component is a blowing agent admixed with said algal pulp.

33. The method of claim 22, wherein said foaming process comprises carrying out a chemical reaction which results in an evolution of gases in a suspension of said algal pulp.

34. The method of claim 33, wherein said evolved gas is carbon dioxide.

35. The method of claim 33, wherein said evolved gas is nitrogen.

36. The method of claim 33, wherein said chemical reaction is a thermal decomposition of a chemical blowing agent.

37. The method of claim 22, wherein said foaming process comprises applying a vacuum to a suspension of said algal pulp to vacuum expand a gas dissolved in said suspension.

38. The method of claim 22, wherein said foaming process comprises whipping a gas into a suspension of said algal pulp.

39. The method of claim 22, wherein said foaming process comprises admixing, in a suspension of said algal pulp, crystals which are soluble in a solvent in which said algal pulp is insoluble, and dissolving said crystals with said solvent in a substantially dried mixture of said crystals and said algal pulp.

40. The method of claim 22, wherein said algal pulp is prepared by pulping a filamentous algal mass using a pulping process selected from the group consisting of a mechanical pulping process, a chemical pulping process, a biological pulping process, and combinations thereof.

41. The method of claim 22, wherein said algal pulp is further prepared by admixing at least one application additive with said pulped algal mass.

42. The method of claim 41, wherein said application additive is selected from the group consisting of antioxidants, antistatic agents, compatibilizers, flame retardants, heat stabilizers, water repellents, impact modifiers, lubricants, ultraviolet stabilizers, biocides, pigments, colorants, fillers, impact modifiers/plasticizers, foam stabilizers, viscosity modifiers, and combinations thereof.

43. The method of claim 22, wherein said foamed algal fiber matrix is formed in a shape of a molded packing material.

44. The method of claim 22, wherein said foamed algal fiber matrix is formed in a shape of packing particles.

45. A foamed packing material comprising a foamed and stabilized filamentous algal fiber matrix having substantial dimensional stability and lacking isocyanates.

46. The foamed packing material of claim 45, further comprising an application additive selected from the group consisting of antioxidants, antistatic agents, compatibilizers, flame retardants, heat stabilizers, water repellents, impact modifiers, lubricants, ultraviolet stabilizers, biocides, pigments, colorants, fillers, impact modifiers/plasticizers, foam stabilizers, viscosity modifiers, and combinations thereof.

47. The foamed packing material of claim 45, further comprising an additional polysaccharide component.

48. The foamed packing material of claim 47, wherein said additional polysaccharide component is selected from the group consisting of unmodified vegetable starches, modified vegetable starches, alginates, glyeosaminoglycans, hexosamines, pentosans, guar gums, cellulose, methylcellulose, hydroxypropyl cellulose, hydroxyethylcellulose, hydroxypropylmethylcellulose, hydroxypropylbutylmethylcellulose, sodium carboxy methylcellulose, polyvinyl-pyrrolidone bentonite, agar, dextran, chitin, polymaltose, polyfructose, pectin, and combinations thereof.

49. The foamed packing material of claim 45, further comprising a high gluten starch.

50. The foamed packing material of claim 46, wherein said additional plastcizer is selected from the group consisting of polyethylenes, polyisobutylenes, polypropylenes, poly(vinyl chlorides), poly(vinyl acetates), polyvinyl alcohols, polystyrenes, polyacrylonitriles, polyvinylcarbazols, polyamides, essentially water-insoluble poly(acrylates), essentially water-insoluble poly(methacrylates), poly(lactic acids), poly(hydrobutyrate-co-hydroxyvalerates), methacrylate-acrylonitrile-butadiene-styrene, acrylonitrile-butadiene-styrene, chlorinated poly-ethylene, polyvinyl alcohols, ethylene-vinyl acetate, polyolefines, polyacetals, thermoplastic polycondensates, polyarylethers, polyimides, alkylene/vinyl ester-copolymers, ethylene/vinyl alcohol-copolymers, alkylene/acrylates copolymers, methacrylate copolymers, ethylene/ethyl acrylate-copolymers, ethylene/methyl acrylate-copolymers, ABS-copolymers, styrene/acrylonitrile-copolymers, alkylene/maleic anhydride copolymers, acrylamide/acrylonitrile copolymers, polyvinyl acetatephthates, polyvinyl pyrolidone, poly(alkylene oxides), poly(propylene glycols), poly(ethyleneopropylene glycols), polyisobutylenes, lignin acrylamides, lignin 2-hydroxyethylmethercrylates, glycerol, pentaerythritol, glycerol monoacetate, diacetates, triacetates, propylene glycol, sorbitol, sodium diethylsulfosuccinate, triethyl citrate, tributyl citrate, and mixtures thereof.

51. The foamed packing material of claim 45, wherein said filamentous algal fiber matrix comprises fiber of a filamentous green algae selected from the order Cladophorales.

52. The foamed packing material of claim 51, wherein said filamentous green algae is *Cladophora glomerata* Kuetzing.

* * * * *